(12) United States Patent
Arndt et al.

(10) Patent No.: US 8,838,414 B2
(45) Date of Patent: Sep. 16, 2014

(54) DETERMINING WHEN TO CREATE A PREDICTION BASED ON DELTAS OF METRIC VALUES

(75) Inventors: Karla K. Arndt, Rochester, MN (US); James M. Caffrey, Woodstock, NY (US); Aspen L. Payton, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 734 days.

(21) Appl. No.: 13/087,467

(22) Filed: Apr. 15, 2011

(65) Prior Publication Data

US 2012/0265723 A1   Oct. 18, 2012

(51) Int. Cl.
*G06N 5/04* (2006.01)
*G06N 7/00* (2006.01)

(52) U.S. Cl.
CPC .................................... *G06N 7/005* (2013.01)
USPC ........... 702/181; 702/182; 702/183; 702/186; 702/188; 709/223; 709/224; 700/108

(58) Field of Classification Search
USPC .......... 702/181, 182, 183, 186, 188; 709/224, 709/223; 700/108
See application file for complete search history.

(56) References Cited

U.S. PATENT DOCUMENTS 7,693,982 B2 * 4/2010 Goldszmidt et al. .......... 709/224
2006/0293777 A1 * 12/2006 Breitgand et al. ............ 700/108

* cited by examiner

*Primary Examiner* — Jonathan C Teixeira Moffat
*Assistant Examiner* — Hien Vo
(74) *Attorney, Agent, or Firm* — Owen J. Gamon; Grant A. Johnson

(57) ABSTRACT

In an embodiment, deltas are calculated between respective current metric values for respective entities and previous metric values for the respective entities. A subset of the deltas is determined. A sum of the subset is calculated, and the sum is divided by a number of the subset to create an average delta for the subset. If one of the respective entities has one of the deltas that is greater than or equal to the average delta for the subset and the one of the respective entities was not previously used to create the previous prediction, then a current prediction is created.

20 Claims, 4 Drawing Sheets

DETERMINING WHEN TO CREATE A PREDICTION BASED ON DELTAS OF METRIC VALUES

FIELD

An embodiment of the invention generally relates to computer systems and more particularly to computer system predictions and metric values.

BACKGROUND

Computer systems typically comprise a combination of computer programs and hardware, such as semiconductors, transistors, chips, circuit boards, storage devices, and processors. The computer programs are stored in the storage devices and are executed by the processors. The storage devices also store data.

The computer programs execute to read, store, and analyze the data. One type of computer program is called predictive analytics, which analyzes the data, capturing relationships between the data, in order to make predictions about future events and trends. One example of predictive analytics is the modeling of resource use in a computer system, in order to predict the probability that various executing jobs or tasks may encounter an error in the future. Predictive analytics often use statistical algorithms to make predictions from the data, including a linear regression algorithm, a non-linear regression algorithm, a logistic regression algorithm, a multinomial logistic regression algorithm, and many others.

SUMMARY

A method, computer-readable storage medium, and computer system are provided. In an embodiment, deltas are calculated between current metric values for respective entities and previous metric values for the respective entities. A subset of the deltas is determined. A sum of the subset is calculated, and the sum is divided by a number of the deltas in the subset, to create an average delta for the subset. If one of the respective entities has one of the deltas that is greater than or equal to the average delta for the subset and the one of the respective entities was not previously used to create the previous prediction, then a current prediction is created.

It is to be noted, however, that the appended drawings illustrate only example embodiments of the invention, and are therefore not considered a limitation of the scope of other embodiments of the invention.

DETAILED DESCRIPTION

Figure 1:
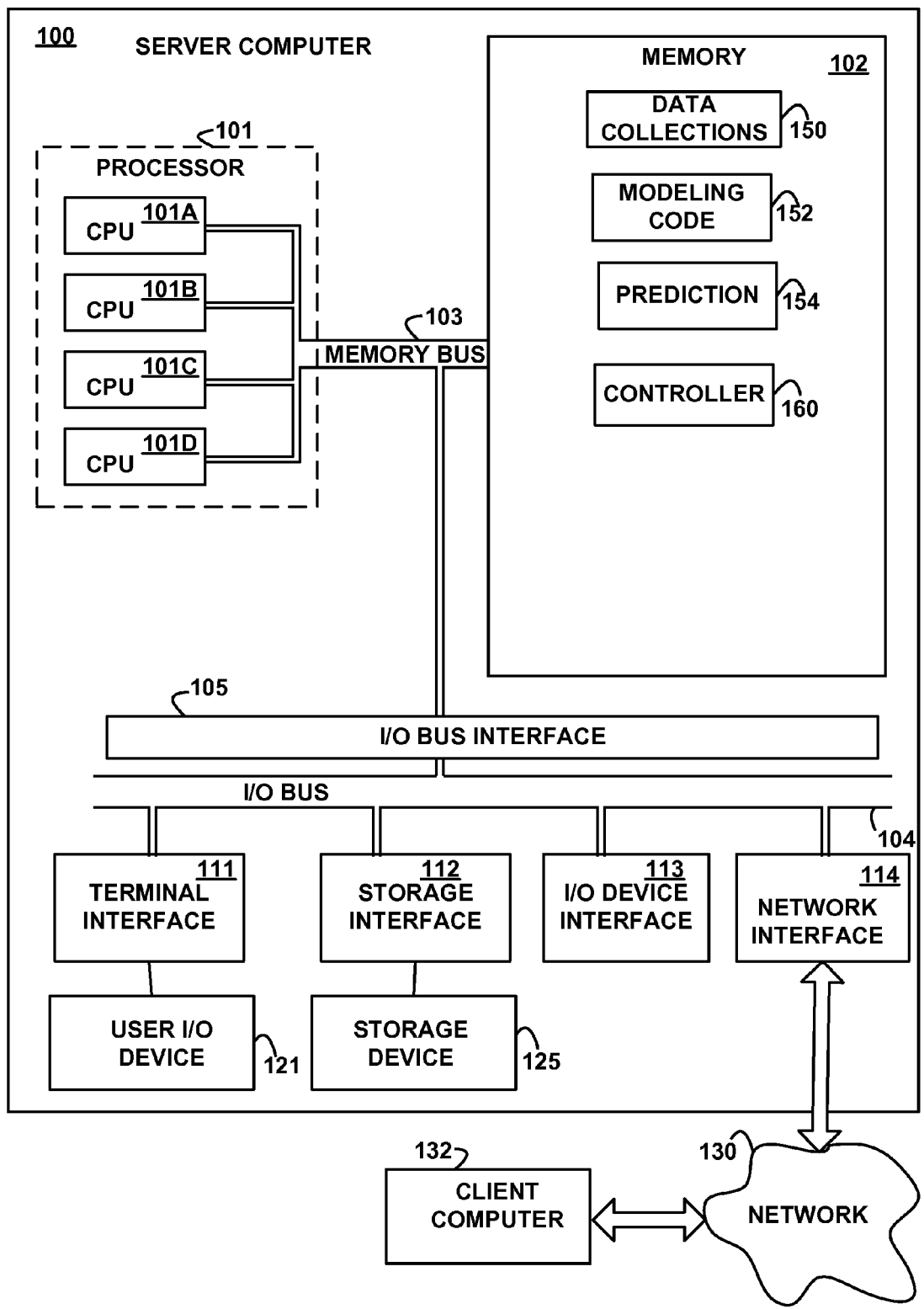
FIG. 1 depicts a high-level block diagram of an example system for implementing an embodiment of the invention.

Referring to the Drawings, wherein like numbers denote like parts throughout the several views, FIG. 1 depicts a high-level block diagram representation of a server computer system 100 connected to a client computer system 132 via a network 130, according to an embodiment of the present invention. The term "server" is used herein for convenience only, and in various embodiments a computer system that operates as a client computer in one environment may operate as a server computer in another environment, and vice versa. The mechanisms and apparatus of embodiments of the present invention apply equally to any appropriate computing system.

The major components of the computer system 100 comprise one or more processors 101, a memory 102, a terminal interface 111, a storage interface 112, an I/O (Input/Output) device interface 113, and a network adapter 114, all of which are communicatively coupled, directly or indirectly, for inter-component communication via a memory bus 103, an I/O bus 104, and an I/O bus interface unit 105.

The computer system 100 comprises one or more general-purpose programmable central processing units (CPUs) 101A, 101B, 101C, and 101D, herein generically referred to as the processor 101. In an embodiment, the computer system 100 comprises multiple processors typical of a relatively large system; however, in another embodiment the computer system 100 may alternatively be a single CPU system. Each processor 101 executes instructions stored in the memory 102 and may comprise one or more levels of on-board cache.

In an embodiment, the memory 102 may comprise a random-access semiconductor memory, storage device, or storage medium for storing or encoding data and programs. In another embodiment, the memory 102 represents the entire virtual memory of the computer system 100, and may also include the virtual memory of other computer systems coupled to the computer system 100 or connected via the network 130. The memory 102 is conceptually a single monolithic entity, but in other embodiments the memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 102 is encoded with or stores data collections 150, modeling code 152, a prediction 154, and a controller 160. Although the data collections 150, the modeling code 152, the prediction 154, and the controller 160 are illustrated as being contained within the memory 102, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, the data collections 150, the modeling code 152, the prediction 154, and the controller 160 are not necessarily all completely contained in the same storage device at the same time. Further, although the data collections 150, the modeling code 152, the prediction 154, and the controller 160 are illustrated as being separate entities, in other embodiments some of them, portions of some of them, or all of them may be packaged together.

In an embodiment, the modeling code 152 and/or the controller 160 comprise instructions or statements that execute on the processor 101 or instructions or statements that are interpreted by instructions or statements that execute on the processor 101, to carry out the functions as further described below with reference to FIGS. 2, 3, and 4. In another embodiment, the modeling code 152 and/or the controller 160 are implemented in hardware via semiconductor devices, chips, logical gates, circuits, circuit cards, and/or other physical hardware devices in lieu of, or in addition to, a processor-based system. In an embodiment, the modeling code 152 and/or the controller 160 comprise data in addition to instructions or statements.

The memory bus 103 provides a data communication path for transferring data among the processor 101, the memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104.

The I/O interface units support communication with a variety of storage and I/O devices. For example, the terminal interface unit 111 supports the attachment of one or more user I/O devices 121, which may comprise user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 121 and the computer system 100, and may receive output data via the user output devices. For example, a user interface may be presented via the user I/O device 121, such as displayed on a display device, played via a speaker, or printed via a printer.

The storage interface unit 112 supports the attachment of one or more disk drives or direct access storage devices 125 (which are typically rotating magnetic disk drive storage devices, although they could alternatively be other storage devices, including arrays of disk drives configured to appear as a single large storage device to a host computer). In another embodiment, the storage device 125 may be implemented via any type of secondary storage device. The contents of the memory 102, or any portion thereof, may be stored to and retrieved from the storage device 125, as needed. The I/O device interface 113 provides an interface to any of various other input/output devices or devices of other types, such as printers or fax machines. The network adapter 114 provides one or more communications paths from the computer system 100 to other digital devices and computer systems 132; such paths may comprise, e.g., one or more networks 130.

Although the memory bus 103 is shown in FIG. 1 as a relatively simple, single bus structure providing a direct communication path among the processors 101, the memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may, in fact, comprise multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 is implemented as a desktop computer, portable computer, laptop or notebook computer, tablet computer, pocket computer, telephone, smart phone, pager, automobile, teleconferencing system, appliance, or any other appropriate type of electronic device.

The network 130 may be any suitable network or combination of networks and may support any appropriate protocol suitable for communication of data and/or code to/from the computer system 100 and the computer system 132. In various embodiments, the network 130 may represent a storage device or a combination of storage devices, either connected directly or indirectly to the computer system 100. In another embodiment, the network 130 may support wireless communications. In another embodiment, the network 130 may support hard-wired communications, such as a telephone line or cable. In another embodiment, the network 130 may be the Internet and may support IP (Internet Protocol). In another embodiment, the network 130 is implemented as a local area network (LAN) or a wide area network (WAN). In another embodiment, the network 130 is implemented as a hotspot service provider network. In another embodiment, the network 130 is implemented an intranet. In another embodiment, the network 130 is implemented as any appropriate cellular data network, cell-based radio network technology, or wireless network. In another embodiment, the network 130 is implemented as any suitable network or combination of networks. Although one network 130 is shown, in other embodiments any number of networks (of the same or different types) may be present.

The client computer 132 may comprise some or all of the hardware and computer program elements of the computer 100. The client computer 132 may also comprise additional elements not illustrated for the computer 100.

FIG. 1 is intended to depict the representative major components of the computer system 100, the network 130, and the client computer 132. But, individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations. The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs."

The computer programs comprise one or more instructions or statements that are resident at various times in various memory and storage devices in the computer system 100 and that, when read and executed by one or more processors in the computer system 100 or when interpreted by instructions that are executed by one or more processors, cause the computer system 100 to perform the actions necessary to execute steps or elements comprising the various aspects of embodiments of the invention. Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (an non-exhaustive list) of the computer-readable storage media may comprise: an electrical connection having one or more wires, a portable computer diskette, a hard disk (e.g., the storage device 125), a random access memory (RAM) (e.g., the memory 102), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, radio frequency, or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the invention may also be delivered as part of a service engagement with a client corporation, non-profit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention are not limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments of the invention.

Figure 2:
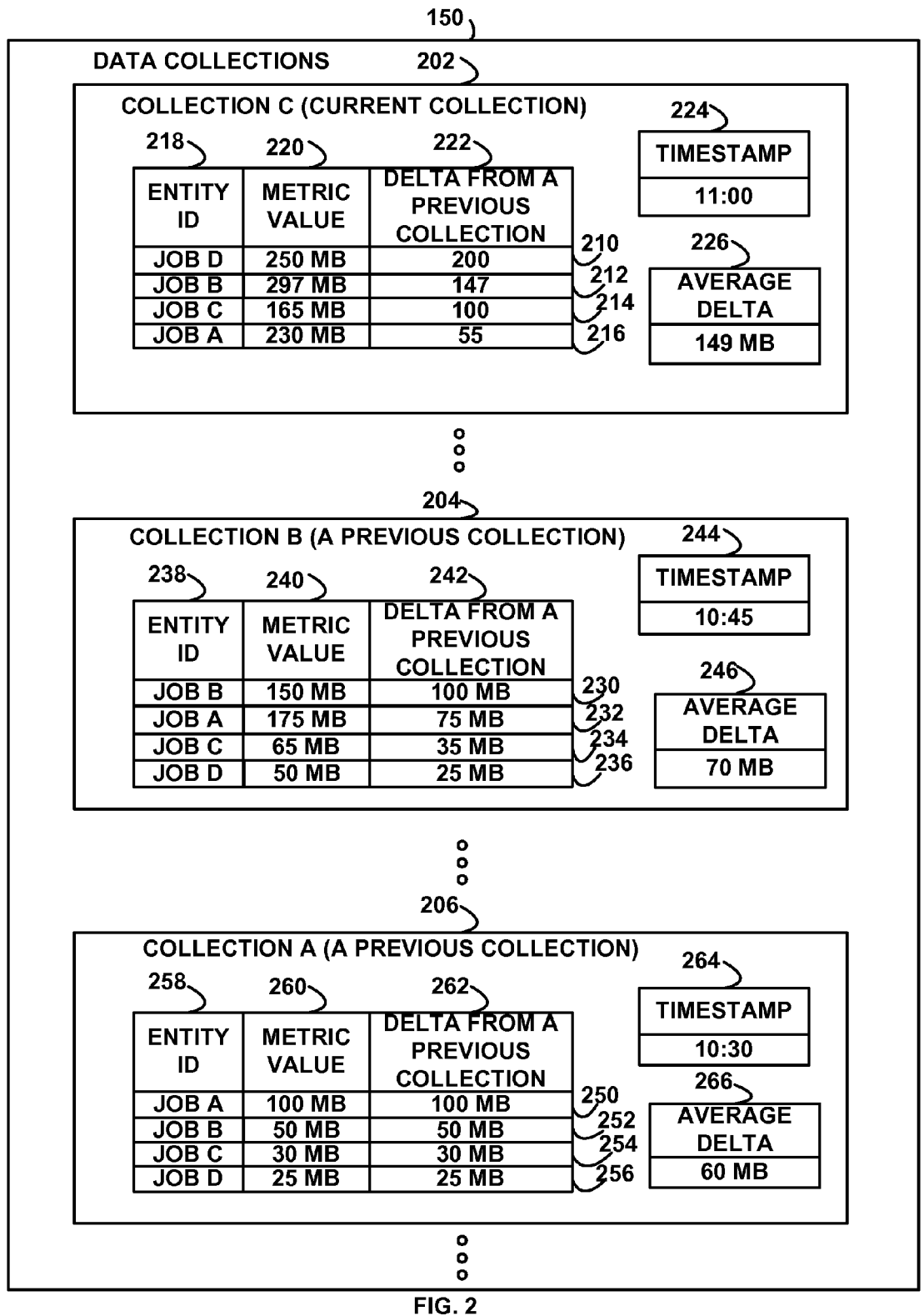
FIG. 2 depicts a block diagram of an example data structure for data collections, according to an embodiment of the invention.

FIG. 2 depicts a block diagram of an example data structure for data collections 150, according to an embodiment of the invention. The data collections 150 comprise an example collection 202, an example collection 204, and an example collection 206. The example collection 202 comprises records 210, 212, 214, and 216, each of which comprises an entity identifier 218, a metric value 220, and a delta 222. The example collection 202 further comprise a timestamp 224 and an average delta 226. The example collection 204 comprises records 230, 232, 234, and 236, each of which comprises an entity identifier 238, a metric value 240, and a delta 242. The example collection 204 further comprises a timestamp 244 and an average delta 246. The example collection 206 comprises records 250, 252, 254, and 256, each of which comprises an entity identifier 258, a metric value 260, and a delta 262. The example collection 206 further comprises a timestamp 264 and an average delta 266.

In an embodiment, the entity identifiers 218, 238, 258 identify entities, components, elements, or units of the computer system 100 that perform actions, steps, operations, or functions. By way of example and not of limitation, entities may include jobs, tasks, methods, threads, cards, I/O processors, or I/O adapters. In an embodiment, the metric values 220, 240, 260 specify a data value of a resource associated with the entities identified by the entity identifiers 218, 238, 258 in the same record. In various embodiments, the metric values 220, 240, 260 specify an amount of a resource in the computer 100 that is read, used, or consumed by the associated entity, allocated or assigned to or received by the associated entity, locked by the associated entity, created by the associated entity, or stored by the associated entity. In various embodiments, the metric values 220, 240, 260 specify rates of usage of resources, average usages of resources over time, or changes in usage of resources from one collection to the next. By way of example and not of limitation, resources may include memory, storage, cache lines, network bandwidth, and processor cycles.

In other embodiments, the entities and/or resources represented by the respective entity identifiers 218, 238, 258 and the metric values 220, 240, 260 may exist outside of the computer system 100. By way of example and not of limitation, entities and resources may include persons, companies, organizations, organisms, money, and physical objects or machines.

The timestamps 224, 244, 264 specify the date and/or time at which the metric values 220, 240, 260 in the records in the respective collections were collected or stored. In various embodiments, the controller 160 may periodically receive or collect the entity identifiers and the respective metric and store them in the collection at the date and/or time indicated by the timestamps 224, 244, 264. The deltas 222, 242, 262 specify the difference between the metric values 220, 240, 260 of an entity and the metric values 220, 240, 260 of the same entity in a different second collection, collected at a different, previous time as indicated by the timestamps 224, 244, 264, as compared to the timestamp in the second collection. In an embodiment, the controller 160 calculates the delta 222 compared to the metric values of the second collection whose timestamp is immediately previous to the timestamp 224 of the current collection 202, with no interceding third collection having a timestamp between the current collection and the second collection. In another embodiment, the controller 160 calculates the delta 222 compared to a second, previous collection, and any number of other collections may have timestamps between the timestamp 224 of the current collection 202 and the timestamp of the second collection. In an embodiment, for each entity identifier 218 in each record in the current collection 202, the controller 160 calculates the delta 222 to be the result of the metric value 220 for an entity identifier in the current collection minus the metric value of the same entity identifier in a previous collection. In an embodiment, if no previous collection exists, if the metric value for the same entity identifier in the previous collection is larger than the metric value in the current collection, or if the entity identifier that exists in the current collection does not exist in the previous collection, then the controller 160 copies the metric value 220 for that entity identifier to the delta 222. In an embodiment where the metric value 220 is already a delta, the controller 160 copies the metric value 220 to the delta 222. Thus, in an embodiment, the delta 222 is greater than or equal to zero. The average deltas 226, 246, 266 specify the average of a subset of the respective deltas 222, 242, 262 that are the largest deltas. In various embodiments, the number of the deltas in the subset used to calculate the average is a predetermined or calculated number or all of the deltas in the subset are greater than a threshold.

In the example of FIG. 2, the collection 202 is the current collection, meaning that the metric values 220 are newer or were collected at a more recent time than the metric values 240 and 260 of the previous collections 204 and 206, as indicated by the timestamp 224 being at a more recent time than the timestamps 244 and 264 of the previous respective collections 204 and 206. In the example of FIG. 2, the controller 160 has calculated the deltas 222 in the current collection 202 as the difference between the metric values 220 of the current collection 202 and the metric values 240 of the previous collection 204, but in other embodiments, the controller 160 may calculate the deltas 222 as the difference between the metric values 220 and the metric values 260 of the previous collection 206, or any other appropriate previous collection. As metric values are collected over time, the collection designated as the current collection changes. Thus, at the time of the timestamp 244 that the controller 160 collected the metric values 240 of the collection 204, the collection 204 was the current collection; at the time of the timestamp 264 that the controller 160 collected the metric values 260 in the collection 206, the collection 206 was the current collection, etc.

Figure 3:
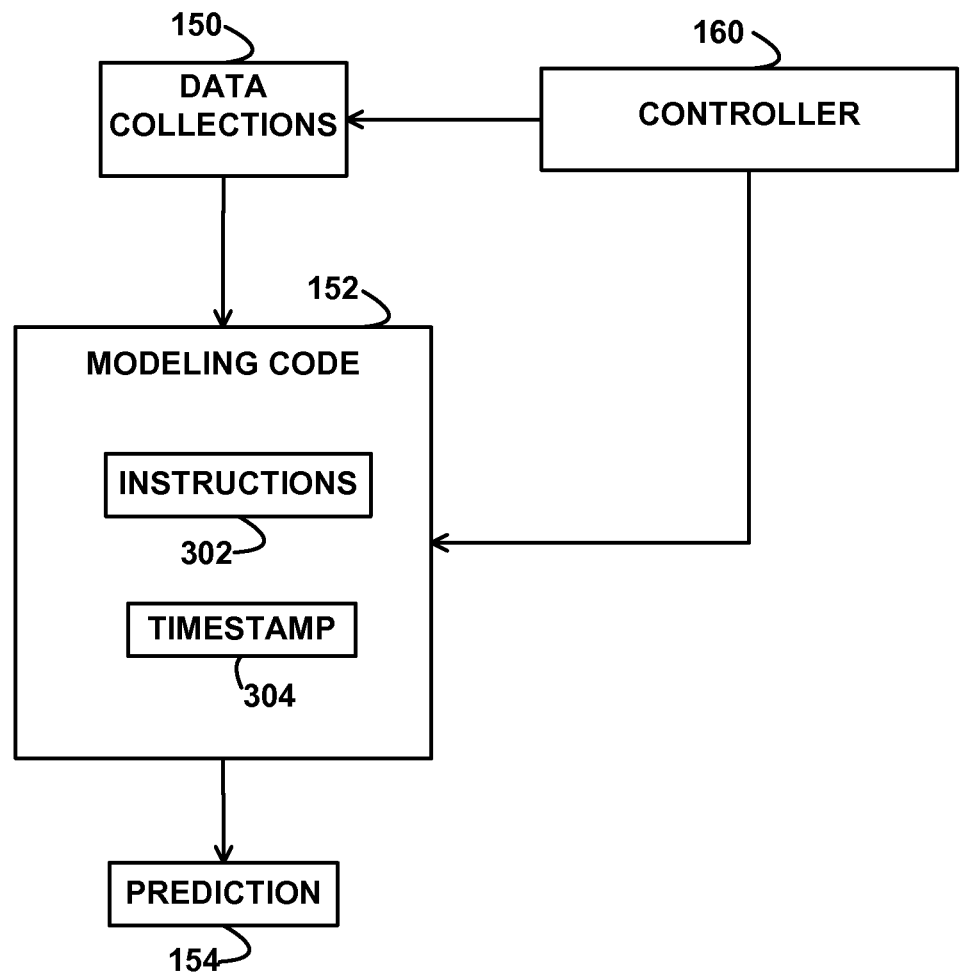
FIG. 3 depicts a block diagram of an example interaction between modeling code, data collections, and a prediction, according to an embodiment of the invention.

FIG. 3 depicts a block diagram of an example interaction between the modeling code 152, the data collections 150, the prediction 154, and the controller 160, according to an embodiment of the invention. The modeling code 152 comprises instructions 302 and a timestamp 304. The instructions 302 of the modeling code 152 execute on the processor 101 to read the data collections 150 and create the prediction 154. In various embodiments, the instructions 302 implement statistical algorithms to make the prediction 154 from the data collections 150, such as a linear regression algorithm, a non-linear regression algorithm, a logistic regression algorithm, a multinomial logistic regression algorithm, or any other appropriate algorithm. The timestamp 304 specifies the most recent date and/or time that the modeling code 152 created the prediction 154. In embodiment, the prediction 154 comprises a probability that various executing jobs or tasks may encounter an error in the future, but in other embodiments any appropriate prediction or output of the modeling code 152 may be used. The controller 160 periodically or at specified times receives or collects metric values and stores the metric values to the data collections 150. The controller 160 also determines the time at which the modeling code 152 executes.

Figure 4:
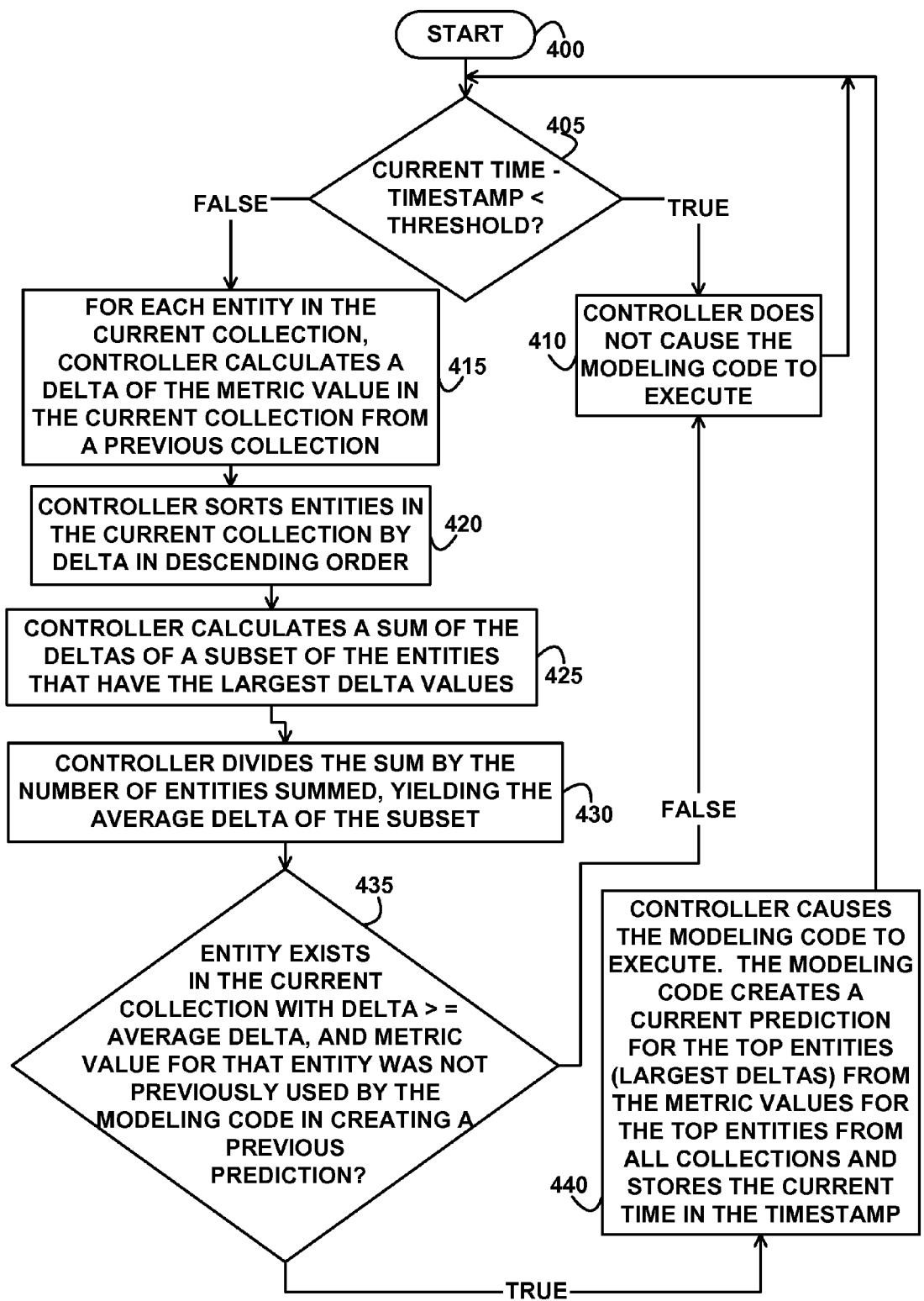
FIG. 4 depicts a flowchart of example processing, according to an embodiment of the invention.

FIG. 4 depicts a flowchart of example processing, according to an embodiment of the invention. Control begins at block 400. Control then continues to block 405 where the controller 160 determines whether the modeling code 152 has been executed too recently to need re-execution. That is, the controller 160 determines whether the current time minus the time indicated by the model timestamp 304 is less than a threshold amount of time. If the determination at block 405 is true, then the current time minus the model timestamp 304 is less than a threshold amount of time, so control continues to block 410 where the controller 160 waits for an amount of time without causing the modeling code 152 to re-execute and without creating a new prediction. Control then returns to block 405 where the controller 160 once again determines whether the modeling code 152 is too new to need re-execution. In another embodiment, the functions of blocks 405 and 410 may be implemented via a timer that fires once the elapsed time since the modeling code 152 was last executed exceeds a threshold.

If the determination at block 405 is false, then the current time minus the model timestamp 304 is greater than or equal to the threshold amount of time, so control continues to block 415 where the controller 160, for each entity in the current collection, calculates the deltas 222 of the metric values 220 in current collection 202 compared to the metric values 240 or 260 in a previous collection and stores the results to the deltas 222 in the current collection. In an embodiment, for each entity identifier 218 in each record in the current collection 202, the controller 160 calculates the delta 222 to be the result of the metric value 220 for an entity identifier in the current collection minus the metric value of the same entity identifier in a previous collection. In an embodiment, if no previous collection exists, if the metric value for the same entity identifier in the previous collection is larger than the metric value in the current collection, or if the entity identifier that exists in the current collection does not exist in the previous collection, then the controller 160 copies the metric value 220 for that entity identifier to the delta 222. In an embodiment where the metric value 220 is already a delta, the controller 160 copies the metric value 220 to the delta 222. Thus, in an embodiment, the delta 222 is greater than or equal to zero.

Control then continues to block 420 where the controller 160 sorts the records 210, 212, 214, and 216 in the current collection 202 by the delta 222 in descending order. Control then continues to block 425 where the controller 160 calculates a sum of the deltas 222 of a subset of the entities 218 that have the largest delta values 222. In various embodiments, the controller 160 calculates the sum of the deltas 222 that are greater than a threshold value or calculates the sum of the largest deltas up to a maximum number of entities (i.e., the deltas in the subset are greater than the deltas not in the subset and the number of entities in the subset equals a specified maximum number). In various embodiments, the controller 160 does not use the delta values 222 in the sum for those entities 218 whose deltas 222 are less than or equal to the threshold value or for those entities 218 that are the smallest once the maximum number of deltas have been summed. Using the example data of FIG. 2, if the threshold value is "60," then the controller 160 chooses the subset of the entities in the current collection 202 to be the entities whose deltas 222 are greater than "60," which are the entities in records 210, 212, and 214 and calculates the sum of 200+147+100=447. The controller 160 does not use the delta of job A, in this example, because the delta of job A (55) is less than the threshold of 60. Alternatively, if the maximum number of entities in the subset is three, then the controller 160 chooses the subset of the entities in the current collection 202 to be the three entities with the largest deltas, which are the entities in the records 210, 212, and 214 and calculates the sum of their deltas 222 as 200+147+100=447.

Referring again to FIG. 4, control then continues to block 430 where the controller 160 divides the calculated sum (previously calculated by the logic of block 425) by the number of entities summed, yielding the average delta of the summed entities. The controller 160 stores the average delta 226 to the current collection 202. In the example of FIG. 2, the controller 160 stores the average delta of 447/3=149 to the average delta 226 of the current collection 202.

Referring again to FIG. 4, control then continues to block 435 where the controller 160 determines whether an entity identifier exists in the current collection that has a delta 222, in the same record, greater than or equal to the average delta 226, and the metric value collected in a previous collection for that same entity identifier was not previously used by the modeling code 152 in creating a previous prediction 154. In various embodiments, the modeling code 152 stores indications of which entity identifiers and metric values were used and not used, in creating a prediction, into the current collection, into the modeling code 152, or into the prediction 154. If the determination at block 435 is true, then an entity identifier exists in the current collection with a delta 222 greater than or equal to the average delta 226, and the metric value collected for that entity identifier in a previous collection was not previously used by the modeling code 152 in creating a previous prediction 154, so control continues to block 440 where the controller 160 causes the modeling code 152 to execute. The modeling code 152 executes and creates and stores a current prediction to the prediction 154 for the top entities from the respective metric values for the top entities from all collections (or from a subset of the collections) and stores the current time into the model timestamp 304. The modeling code 152 calculates the top entities to be the entities that have deltas, in the same respective records, larger than a threshold value. The threshold value used in block 440 may be the same or different from the threshold value used in block 425. Control then returns to block 405, as previously described above.

If the determination at block 435 is false, then all of the metric values collected for any entities with deltas 222 greater than or equal to the average delta 226 were previously used by the modeling code 152 in creating a prediction 154 (i.e., all entities that were not previously used to create a prediction have metric values that are less than the current average delta 226), so control continues to block 410 where the controller 160 refrains from causing the modeling code 152 to execute and does not create a new prediction. Control then returns to block 405, as previously described above.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention.

In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention. Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense.

What is claimed is:

1. A computer-implemented method comprising:
   calculating by a computer-based processor a plurality of deltas between a plurality of respective current metric values for a plurality of respective entities and a plurality of previous metric values for the plurality of respective entities;
   determining a subset of the plurality of deltas;
   calculating by a computer-based processor a sum of the subset of the plurality of deltas and dividing the sum by a number of the subset to create an average delta for the subset; and
   if one of the plurality of respective entities has one of the plurality of deltas that is greater than or equal to the average delta for the subset and the one of the plurality of respective entities was not previously used to create a previous prediction, creating a current prediction.

2. The method of claim 1, wherein the determining the subset further comprises:
   determining the subset of the plurality of deltas, wherein all of the plurality of deltas in the subset are greater than a threshold.

3. The method of claim 1, wherein the determining the subset further comprises:
   determining the subset of the plurality of deltas, wherein all of the plurality of deltas in the subset are greater than deltas that are not in the subset.

4. The method of claim 1, further comprising:
   if all of the plurality of respective entities that have the plurality of deltas that are greater than or equal to the average delta for the subset were previously used to create the previous prediction, refraining from creating the current prediction.

5. The method of claim 1, wherein the calculating the plurality of deltas further comprises:
   calculating the plurality of deltas between the plurality of respective current metric values for the plurality of respective entities in a current collection and the plurality of previous metric values for the plurality of respective entities in a previous collection, wherein another collection comprising a plurality of respective other metric values for the plurality of respective entities exists, wherein the another collection was collected at a time between the plurality of respective current metric values and the plurality of previous metric values.

6. The method of claim 1, wherein the calculating the plurality of deltas further comprises:
   calculating the plurality of deltas between the plurality of respective current metric values for the plurality of respective entities in a current collection and the plurality of previous metric values for the plurality of respective entities in a previous collection, wherein another collection comprising a plurality of respective other metric values for the plurality of respective entities does not exist for a time between the plurality of respective current metric values and the plurality of previous metric values.

7. The method of claim 6, wherein the creating the current prediction further comprises:
   calculating the current prediction from the plurality of respective entities with a largest of the plurality of deltas.

8. The method of claim 7, wherein the creating the current prediction further comprises:
   calculating the current prediction from the plurality of respective entities with the largest of the plurality of deltas from all of a plurality of collections of metric values, wherein the plurality of collections of metric values comprises the current collection and the previous collection.

9. A non-transitory computer-readable storage medium encoded with instructions, wherein the instructions when executed comprise:
   calculating a plurality of deltas between a plurality of respective current metric values for a plurality of respective entities and a plurality of previous metric values for the plurality of respective entities;
   determining a subset of the plurality of deltas;
   calculating a sum of the subset of the plurality of deltas and dividing the sum by a number of the subset to create an average delta for the subset; and
   if one of the plurality of respective entities has one of the plurality of deltas that is greater than or equal to the average delta for the subset and the one of the plurality of respective entities was not previously used to create a previous prediction, creating a current prediction.

10. The computer-readable storage medium of claim 9, wherein the determining the subset further comprises:
    determining the subset of the plurality of deltas that are greater than a threshold.

11. The computer-readable storage medium of claim 9, further comprising:
    if all of the plurality of respective entities that have the plurality of deltas that are greater than or equal to the average delta for the subset were previously used to create the previous prediction, refraining from creating the current prediction.

12. The computer-readable storage medium of claim 9, wherein the calculating the plurality of deltas further comprises:
    calculating the plurality of deltas between the plurality of respective current metric values for the plurality of respective entities in a current collection and the plurality of previous metric values for the plurality of respective entities in a previous collection, wherein another collection comprising a plurality of respective other metric values for the plurality of respective entities exists, wherein the another collection was collected at a time between the plurality of respective current metric values and the plurality of previous metric values.

13. The computer-readable storage medium of claim 9, wherein the calculating the plurality of deltas further comprises:
    calculating the plurality of deltas between the plurality of respective current metric values for the plurality of respective entities in a current collection and the plurality of previous metric values for the plurality of respective entities in a previous collection, wherein another collection comprising a plurality of respective other metric values for the plurality of respective entities does not exist for a time between the plurality of respective current metric values and the plurality of previous metric values.

14. The computer-readable storage medium of claim 13, wherein the creating the current prediction further comprises:
calculating the current prediction from the plurality of respective entities with a largest of the plurality of deltas.

15. The computer-readable storage medium of claim 14, wherein the creating the current prediction further comprises:
calculating the current prediction from the plurality of respective entities with the largest of the plurality of deltas from all of a plurality of collections of metric values, wherein the plurality of collections of metric values comprises the current collection and the previous collection.

16. A computer comprising:
a processor; and
memory communicatively coupled to the processor, wherein the memory is encoded with instructions, wherein the instructions when executed on the processor comprise:
calculating a plurality of deltas between a plurality of respective current metric values for a plurality of respective entities and a plurality of previous metric values for the plurality of respective entities,
determining a subset of the plurality of deltas that are greater than a threshold,
calculating a sum of the subset of the plurality of deltas and dividing the sum by a number of the subset to create an average delta for the subset,
if one of the plurality of respective entities has one of the plurality of deltas that is greater than or equal to the average delta for the subset and the one of the plurality of respective entities was not previously used to create a previous prediction, creating a current prediction.

17. The computer of claim 16, wherein the instructions further comprise:
if all of the plurality of respective entities that have the plurality of deltas that are greater than or equal to the average delta for the subset were previously used to create the previous prediction, refraining from creating the current prediction.

18. The computer of claim 16, wherein the calculating the plurality of deltas further comprises:
calculating the plurality of deltas between the plurality of respective current metric values for the plurality of respective entities in a current collection and the plurality of previous metric values for the plurality of respective entities in a previous collection, wherein another collection comprising a plurality of respective other metric values for the plurality of respective entities exists, wherein the another collection was collected at a time between the plurality of respective current metric values and the plurality of previous metric values.

19. The computer of claim 16, wherein the calculating the plurality of deltas further comprises:
calculating the plurality of deltas between the plurality of respective current metric values for the plurality of respective entities in a current collection and the plurality of previous metric values for the plurality of respective entities in a previous collection, wherein another collection comprising a plurality of respective other metric values for the plurality of respective entities does not exist for a time between the plurality of respective current metric values and the plurality of previous metric values.

20. The computer of claim 19, wherein the executing the creating the current prediction further comprises:
calculating the current prediction from the plurality of respective entities with a largest of the plurality of deltas from all of a plurality of collections of metric values, wherein the plurality of collections of metric values comprises the current collection and the previous collection.

* * * * *